(No Model.)
J. M. CHADWICK.
ATTACHMENT FOR PLOWS.
No. 491,009. Patented Jan. 31, 1893.
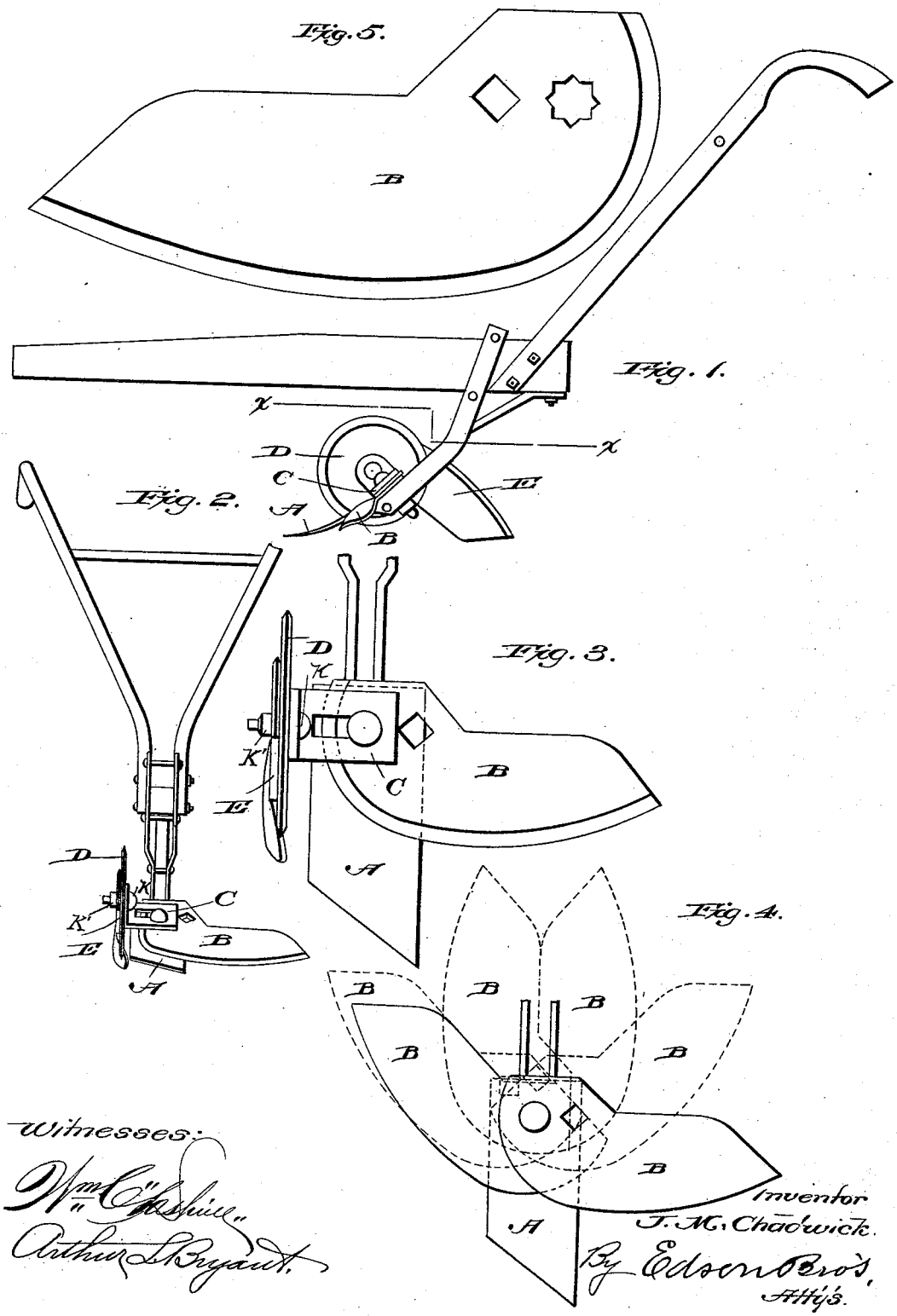
Witnesses:
Wm C Cashill
Arthur L Bryant
Inventor
J. M. Chadwick.
By Edson Bro's,
Att'ys.

UNITED STATES PATENT OFFICE.

JAMES M. CHADWICK, OF GADSDEN, ALABAMA.

ATTACHMENT FOR PLOWS.

SPECIFICATION forming part of Letters Patent No. 491,009, dated January 31, 1893.

Application filed September 21, 1892. Serial No. 446,441. (No model.)

*To all whom it may concern:*

Be it known that I, JAMES M. CHADWICK, a citizen of the United States, residing at Gadsden, in the county of Etowah and State of Alabama, have invented certain new and useful Improvements in Attachments for Plows; and I do hereby declare the following to be a full, clear, and exact description of the invention, such as will enable others skilled in the art to which it appertains to make and use the same.

My invention relates to improvements in attachments for plows, and the object of the invention is to provide a simple attachment which can be readily attached to the point or blade of an ordinary plow and render the same particularly applicable for the cultivation of young plants, especially cotton and corn.

With these ends in view my invention consists in the peculiar construction and arrangement of parts as will be hereinafter fully pointed out and claimed.

In the accompanying drawings, Figure 1 is a side elevation of a plow provided with my improved attachment. Fig. 2 is a front elevation of the same. Fig. 3 is a plan view on the line $x$—$x$ of Fig. 1. Fig. 4 is a detail view of one of the wings and Fig. 5 is a view of the blade or share and deflecting wings with the fender removed.

Like letters of reference denote corresponding parts in the several figures of the drawings, referring to which—

A designates a blade or point of a plow which may be of any desired form and construction. On the blade or point A is secured a deflecting wing B and the bolt by which said wing and share are united, preferably, extends through a slot formed in a plate C arranged on the front face of said wing. Near one end the plate C is bent so as to extend at right angles to the main slotted portion thereof and to this forward and upwardly extending portion is attached a circular cutting disk or fender D. The bolt K by which the disk D is attached to the plate C extends through a suitable aperture formed in a deflecting wing E similar in form to the wing B and said wing is held in position by a suitable nut K' as shown in the drawings. Each of the wings B, E, is provided with two or more apertures to receive the securing bolts by which they are respectively attached to the plow blade and disk D so that said wing can be adjusted longitudinally if desired. The plate C can also be adjusted to bring the cutting disk D the proper distance from the blade or point A. The wings B, E can be turned about their attaching bolts to bring them at any desired angle with relation to the blade A and disk D.

When it is desired to use my improved attachment in the cultivation of young cotton plants or other plants of a similar nature, the parts hereinbefore described are assembled together and secured firmly in the relative positions indicated in Figs. 1 and 2. As the plow is drawn forward the share or blade A turns up the earth in the ordinary manner. The disk D cuts into the earth between the blade A and row of plants and serves to limit the width of the furrow. The earth rising up on the blade or point A is deflected from the plants by the circular fender D and any earth passing between said fender and the blade is deflected away from the plants by the wing E. The wing B operates to cut any grass or weeds which may be in the path thereof.

If desired the plate C and attached fender D can be detached from the point or blade A and the wing E attached thereto. The two wings can then be adjusted to deflect the soil turned up by the plow share or blade in one or both directions as desired. The various positions in which the wings can be adjusted are indicated in Fig. 5.

The advantages of my improved attachment will be readily understood and appreciated.

I am aware that changes in the form and proportion of parts and details of construction of the devices herein shown and described as an embodiment of my invention can be made without departing from the spirit or sacrificing the advantages thereof, and I therefore reserve the right to make such changes and alterations as fairly fall within the scope of the same.

Having thus fully described my invention, what I claim as new and desire to secure by Letters Patent, is:—

1. The combination with a plow, of a deflecting wing attached directly to the blade of the plow, a circular fender supported from the plow blade and another deflecting blade arranged on the opposite side of the circular fender from the plow point, substantially as described.

2. The combination with a plow, of a deflecting wing attached directly to the plow blade, a slotted plate secured on the plow blade, a circular fender fitted on a through bolt attached to the slotted plate and another deflecting wing secured on said through bolt on the opposite side of the circular fender from the plow blade, substantially as described.

3. The combination with a plow, of a deflecting wing arranged on the upper face of the plow blade, a slotted plate arranged in front of said wing and having one end bent upwardly, a single bolt connecting the slotted plate and wing adjacent thereto to the plow blade, a circular fender carried by a bolt attached to the bent up end of the slotted plate and another deflector wing secured on said bolt, substantially as described.

In testimony whereof I affix my signature in presence of two witnesses.

JAMES M. CHADWICK.

Witnesses:
   JAMES L. TUNNINGTON,
   AZARIAH T. FULLER.